United States Patent [19]

Qureshi et al.

[11] Patent Number: 5,920,820
[45] Date of Patent: Jul. 6, 1999

[54] COMBINED HOME LOCATION REGISTER AND SERVICE CONTROL POINT FOR A CELLULAR TELECOMMUNICATIONS NETWORK

[75] Inventors: Rima Qureshi, Westmount; Berislav Hodko, Beaconsfield, both of Canada

[73] Assignee: Telefonaktiebolaget LM Ericsson (publ), Stockholm, Sweden

[21] Appl. No.: 08/591,866

[22] Filed: Jan. 25, 1996

[51] Int. Cl.[6] .................................................. H04Q 7/24
[52] U.S. Cl. ........................................... 455/461; 455/433
[58] Field of Search .................................. 455/422, 432, 455/433, 461, 560, 423; 379/211

[56] References Cited

U.S. PATENT DOCUMENTS

| 5,297,189 | 3/1994 | Chabernaud | 455/461 |
| 5,297,193 | 3/1994 | Bouix et al. | 455/423 |
| 5,303,285 | 4/1994 | Kerihuel et al. | 455/461 |
| 5,353,331 | 10/1994 | Emery et al. | 455/461 |
| 5,377,186 | 12/1994 | Wegner et al. | 370/62 |
| 5,457,736 | 10/1995 | Cain et al. | 455/433 |
| 5,490,203 | 2/1996 | Jain et al. | 455/433 |
| 5,504,804 | 4/1996 | Widmark et al. | 455/433 |
| 5,572,579 | 11/1996 | Orriss et al. | 379/211 |
| 5,581,596 | 12/1996 | Hogan | 455/435 |
| 5,629,974 | 5/1997 | Rajala et al. | 455/466 |

FOREIGN PATENT DOCUMENTS

WO 95/26114  9/1995  WIPO .

OTHER PUBLICATIONS

Endre Skolt and Ivar Oldervik; "Intelligent Networks as a Platform for Provision of Service in GSM and DECT"; *Telektronikk;* Jan. 1, 1995; vol. 91, No. 4, pp. 82–87.

*Primary Examiner*—Dwayne D. Bost
*Assistant Examiner*—Myron K. Wyche
*Attorney, Agent, or Firm*—Steven W. Smith

[57] ABSTRACT

A system in a cellular telecommunications network that combines the functionality of a home location register (HLR) with the functionality of a service control point (SCP) in a single functional unit without accessing the public switched telephone network. The system allows cellular subscribers the degree of mobility that they desire while coordinating the interaction between existing cellular subscriber services and new intelligent network (IN)-derived services. A home location register (HLR) component stores mobile subscriber information and location information on mobile stations. A service control point (SCP) component stores IN services for mobile subscribers. A cellular telecommunication interface based on the IS-41 standard is utilized for communication between the HLR component and the SCP component.

20 Claims, 9 Drawing Sheets

COMBINED HOME LOCATION REGISTER AND SERVICE CONTROL POINT FOR A CELLULAR TELECOMMUNICATIONS NETWORK

BACKGROUND OF THE INVENTION

1. Technical Field of the Invention

This invention relates to cellular telecommunications networks and, more particularly, to a combined home location register and service control point for providing enhanced subscriber services in a cellular telecommunications network.

2. Description of Related Art

In modern telecommunication systems, it has become increasingly important for network operators to be able to provide their subscribers with enhanced subscriber services. These services may include the provision of an 800 Services Database, a Credit Card Verification Database, Geographic Call Routing, Incoming Call Routing, Multi-location Extension Dialing, Network Automatic Call Distribution, Flexible Call Routing, Flexible Carrier Selection, CLASS Calling Name Delivery Database, and others. In wireline telephone systems, a method of providing such enhanced subscriber services is through an Advanced Intelligent Network (AIN).

FIG. 1 is a simplified block diagram of a typical wireline telecommunication system using the AIN to provide enhanced subscriber services. The AIN 12 and its associated Signaling System Number 7 (SS7) protocol are described in the industry standard, "TR-NWT-000246, Bell Communications Research Specification of Signaling System Number 7," which is incorporated by reference herein. A large number of Local Switches (LSs) 13a–n may be connected to a Service Switching Point/Tandem (SSP/T) 14 via multi-frequency (MF) links 15. A "tandem", as used herein, may be a local, LATA, or access tandem. The LSs 13a–n provide connections for subscribers 16a–n into the telecommunications system 11. The AIN 12 uses a system of high speed telecommunications links known as a Common Channel Signaling (CCS) network which employs the standard SS7 signaling protocol to link all of the components of the AIN 12. Standard telephony diagrams, and FIG. 1 herein, indicate links utilizing the SS7 signaling protocol as dotted lines and MF trunks as solid lines.

The components of the AIN 12 may include the SSP/T 14, one or more Signal Transfer Points (STPs) 18a–n which act as intermediate switching nodes, and one or more Service Control Points (SCPs) 19a–n. The SCPs 19 each contain a database of enhanced subscriber services which are accessed and controlled by a Service Logic Program (SLP). The SCP 19 currently utilizes a standardized AIN protocol built on the Transaction Capabilities Application Part (TCAP) for coordination of functions. The current version of the protocol required for communication with the SCP 19 is TCAP/AIN Release 0.1. The SCP 19 is described in the Bellcore recommendation, "TA-NWT-001280, Advanced Intelligent Network (AIN) Service Control Point (SCP) Generic Requirements," which is incorporated by reference herein. The SCP 19 acts as a repository for enhanced subscriber services which may be accessed by any one of the LSs 13a–n. In the absence of the SCP 19, each LS would have to be individually upgraded with enhanced subscriber services by distributing the service logic locally. With the implementation of the AIN 12, and the required communications capabilities in the LSs, new enhanced services need only be added to the SCP 19.

As seen from the above description, the AIN was developed strictly as a wireline communication system. The signaling protocol utilized for AIN allows only for control of telephone network switching elements in response to queries originated by network switching elements. The fixed nature of installed wirelines limits the utilization of the AIN. Therefore, following the development of the AIN, it was recognized that it would be beneficial for wireless communication systems to be able to access the AIN as well. Systems have been proposed that enable mobile telephone users to access the AIN for enhanced services.

One such system is described in U.S. Pat. No. 5,353,331 to Emery et al. (Emery). Emery discloses an integrated wired and wireless communications network that utilizes a SCP in an AIN to store enhanced subscriber services. A mobility controller (MC) is provided to enable access by mobile subscribers in a cellular telecommunications network. The cellular telecommunications network includes a home location register (HLR) which includes a database of subscriber information including location information and a subscriber profile. In Emery, the HLR and the SCP communicate via the TCAP-based communications protocol.

A major problem with systems such as Emery which integrate wireless communication systems with the existing wireline AIN is that they require that the TCAP-based AIN protocol be utilized for communication with the SCP and access to enhanced services. It is a very expensive and inefficient process for equipment suppliers in the cellular telecommunications industry to modify their equipment to utilize the AIN 0.1 protocol. There is no known solution to the above mentioned deficiency and shortcoming of existing systems for providing mobile subscribers with enhanced subscriber services.

It would be a distinct advantage to have a system which provides mobile subscribers with enhanced subscriber services and does not require access to the wireline AIN or modification of cellular equipment to utilize the TCAP-based AIN protocol. The present invention provides such a system.

SUMMARY OF THE INVENTION

It is an object of the present invention to provide enhanced telecommunication services to mobile subscribers by combining the functionality of a home location register (HLR) with the functionality of a service control point (SCP) in a single functional unit for use in cellular telecommunications networks. The HLR and the SCP may be physically co-located or may be remotely located from each other, in which case enhanced IS-41 signaling is utilized as a communications interface between the two parts.

It is another object of the present invention to allow cellular subscribers the degree of mobility that they desire while coordinating the interaction between existing cellular subscriber services and new intelligent network (I)-derived services.

Thus, in one aspect, the present invention is a system for combining cellular telecommunication database functions with intelligent network (IN) functions without accessing the public switched telephone network. The system comprises a home location register (HLR) component for storing mobile subscriber information and location information on mobile stations, a service control point (SCP) component for storing IN services for mobile subscribers, and a cellular telecommunication interface between the HLR component and the SCP component.

In another aspect, the present invention is a combined home location register and service control point (HLR/SCP) for storing mobile subscriber information, intelligent network (IN) services, and mobile station location information. The HLR/SCP comprises an application part comprising a home location register (HLR) component and a service control point (SCP) component.

In still another aspect, the present invention is an intelligent mobile radio telecommunications network comprising a combined home location register and service control point (HLR/SCP) for storing mobile subscriber information, intelligent network (IN) services, and mobile station location information; a mobile switching center (MSC) connected to the HLR/SCP via IS-41 or enhanced IS-41 communication links; and an operation support system for defining the IN services and connecting necessary data to the IN services.

In yet another aspect, the present invention is a method of combining cellular telecommunication database functions with intelligent network (IN) functions without accessing the public switched telephone network. The method comprises the steps of storing in a home location register (HLR) component, mobile subscriber information and location information on mobile stations; storing in a service control point (SCP) component, IN services for mobile subscribers; and providing a cellular telecommunication interface between the HLR component and the SCP component.

In another aspect, the present invention is a method of interconnecting a wireless network and an intelligent network (IN) by utilizing an enhanced IS-41 signaling protocol which has been enhanced to carry IN-related information and support IN functionality.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention is a system which provides enhanced telecommunication services to mobile subscribers by combining the functionality of a home location register (HLR) with the functionality of a service control point (SCP) in a single functional unit for use in cellular telecommunications networks. The HLR and SCP components may be physically co-located or may be remotely located from each other, in which case enhanced IS-41 signaling is utilized as a communications interface between the two parts. The HLR/SCP of the present invention allows cellular subscribers the degree of mobility that they desire and coordinates the interaction between existing cellular subscriber services and new intelligent network (IN)-derived services.

Figure 2:
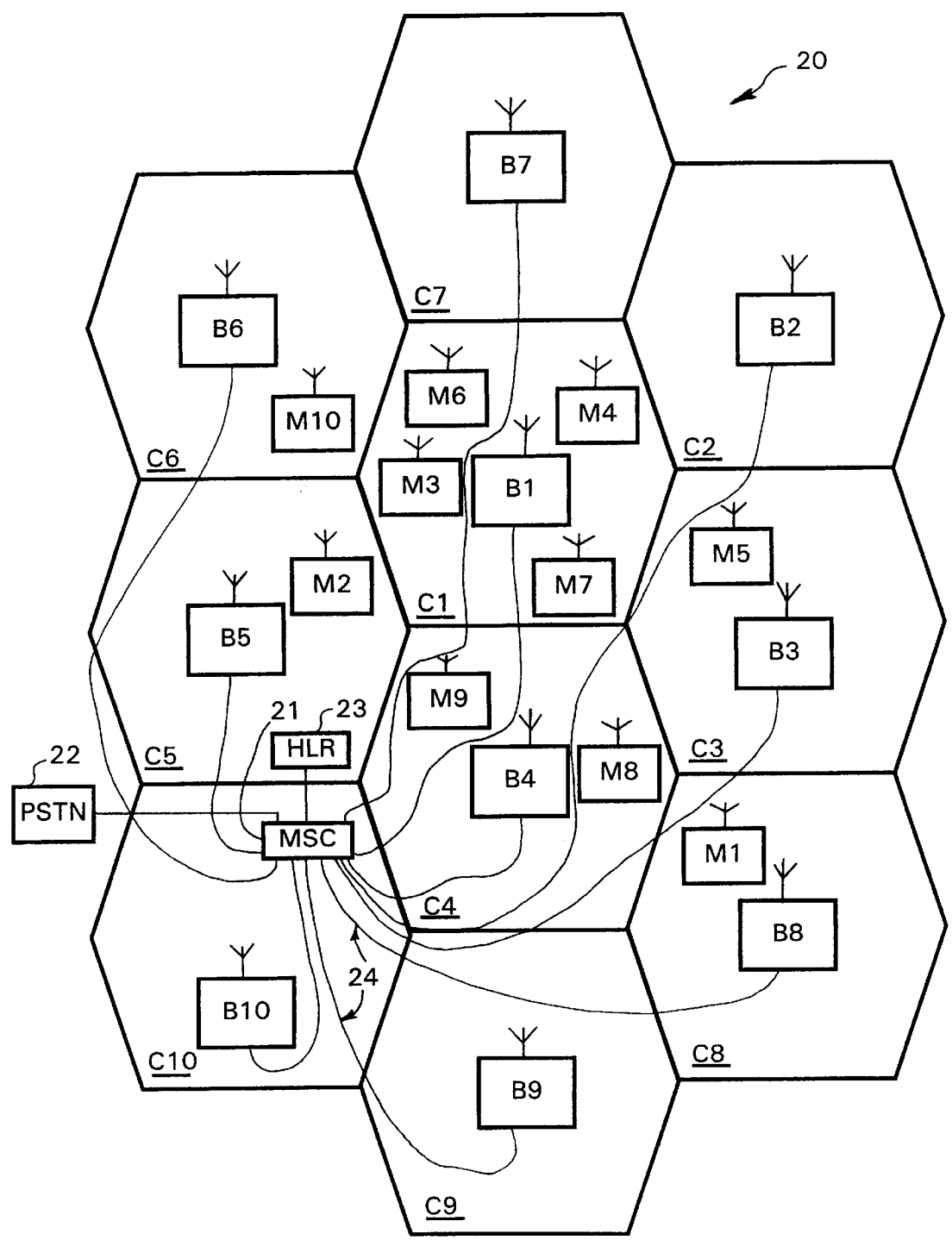
FIG. 2 is a block diagram illustrating components of a cellular radio telecommunications network associated with the present invention.

FIG. 2 is a block diagram illustrating components of a cellular radio telecommunications network 20 associated with the present invention. In FIG. 2, an arbitrary geographic area may be divided into a plurality of continuous radio coverage areas, or cells C1–C10. Although the network of FIG. 2 is illustratively shown to only include 10 cells, it should be clearly understood that in practice, the number of cells could be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 2, the base stations B1–B10 are selected to be located at the center of each of the cells C1–C10, respectively, and are equipped with omni-directional antennas. However, in other configurations of a cellular radio network, the base stations B1–B10 may be located near the periphery, or otherwise away from the centers of the cells C1–C10 and may illuminate the cells C1–C10 with radio signals either omni-directionally or directionally. Therefore, the representation of the cellular radio network of FIG. 2 is for purposes of illustration only and is not intended as a limitation on the possible implementations of a system for providing enhanced subscriber services in a mobile radio telecommunications network.

With continuing reference to FIG. 2, a plurality of mobile stations M1–M10 will be found within the cells C1–C10. Again, only ten mobile stations are shown in FIG. 2, but it should be understood that the actual number of mobile stations may be much larger and, in practice, will invariably greatly exceed the number of base stations. Moreover, mobile stations M1–M10 are illustrated in some of the cells C1–C10. The presence or absence of mobile stations in any particular one of the cells C1–C10 should be understood to depend, in practice on the individual desires of subscribers utilizing the mobile stations M1–M10. Subscribers may roam from one location in a cell to another, or from one cell to an adjacent cell or neighboring cell, and even from one cellular radio network served by a mobile switching center (MSC) 21 to another such network all the while receiving and placing calls both within the cellular network 20 as well as the public switch telecommunication network (PSTN) 22 which is connected to the MSC 21. The MSC 21 may also have associated with it a home location register (HLR) 23 which may be physically separate or connected to the MSC.

The HLR 23 serves as a database of subscriber information for roaming subscribers. The HLR contains all the mobile subscriber data, such as subscriber identity, supplementary services, bearer services, and location information necessary to route incoming calls. The HLR 23 may be shared by a group of MSC's. Networks employing ditgital services may also include a message center (MC) (not shown) for storage and routing of short message service (SMS) messages.

Figure 1:
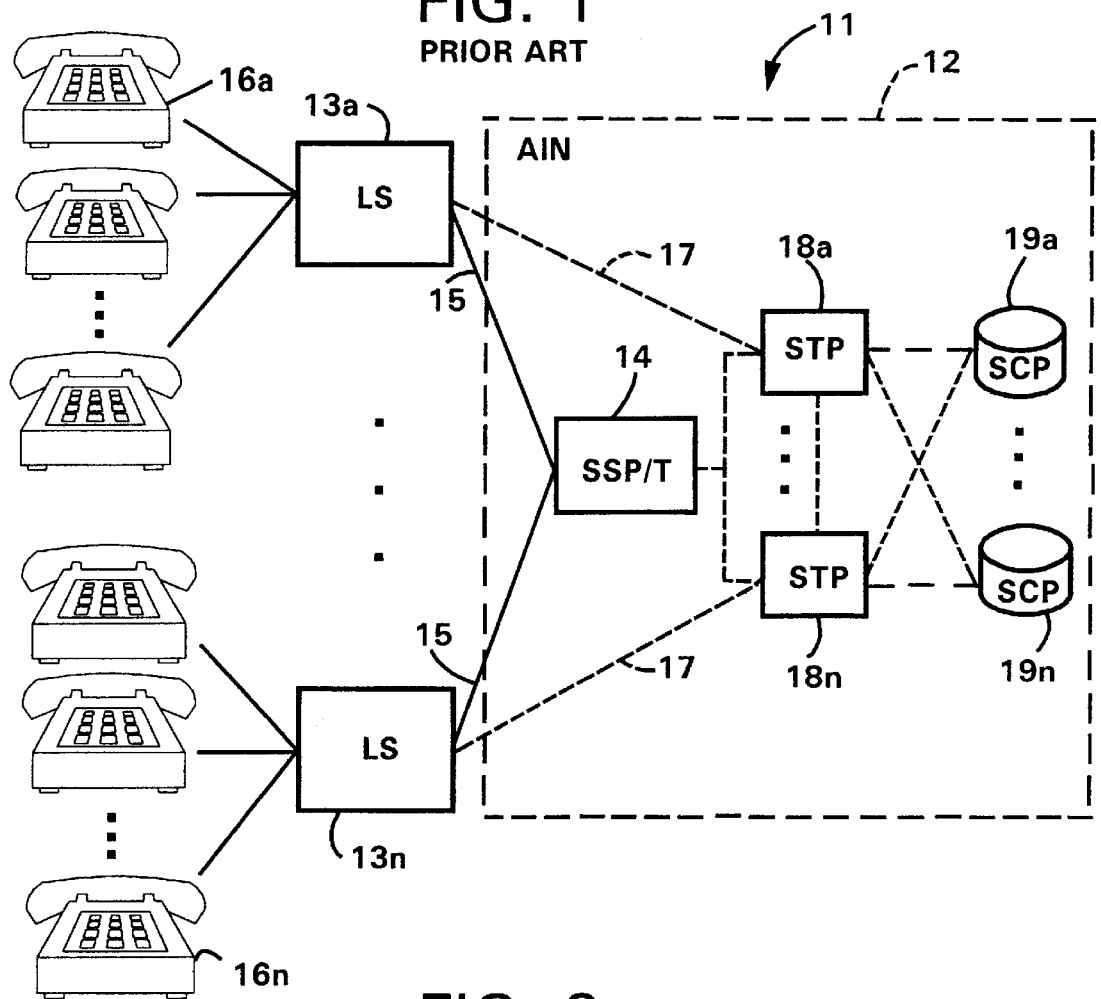
FIG. 1 (Prior art) is a simplified block diagram of a typical wireline telecommunication system using an Advanced Intelligent Network (AIN) to provide enhanced subscriber services.

Each of the mobile stations M1–M10 is capable of initiating or receiving a telephone call through one or more of the base stations B1–B10 and the MSC 21. Such calls may be either for voice or data communications. The MSC 21 is connected by communication links 24 (e.g., cables, microwave links, etc.) to each of the illustrative base stations B1–B10 and the PSTN 22 or a similar fixed network which may include an integrated services digital network (ISDN) facility (not shown). The relevant connections between the MSC 21 and the base stations B1–B10, or between the MSC 21 and the PSTN 22, are not completely shown in FIG. 1 but are well known to those of ordinary skill in the art. Similarly, it is also known to include more than one mobile switching center (MSC) in the cellular radio network and to connect each additional MSC to a different group of base stations and to other MSCs via cables or radio links.

Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within a cellular radio network are sent in accordance with industry established air interface standards, such as EIA/TIA 553, the standard for analog cellular operations, and/or EIA/TIA 627 (formerly IS-54B) and IS-136, the standards for digital cellular operations, all of which are hereby incorporated by reference herein. Integrated services between different cellular telecommunication systems are provided by using the intersystem specification IS-41, which is hereby incorporated by reference herein. While these standards govern North American operations, similar standards govern other geographic areas throughout the world, and are well known to those skilled in the art.

The information exchanged between base stations and mobile stations via messages, may include incoming call signals, outgoing call signals, paging signals, paging response signals, location registration signals, voice channel assignments, maintenance instructions, SMS messages, and handoff instructions as the mobile stations travel out of the radio coverage of one cell and into the radio coverage of other cells, as well as other additional items of information such as calling party numbers, time information, and the like.

Figure 3:
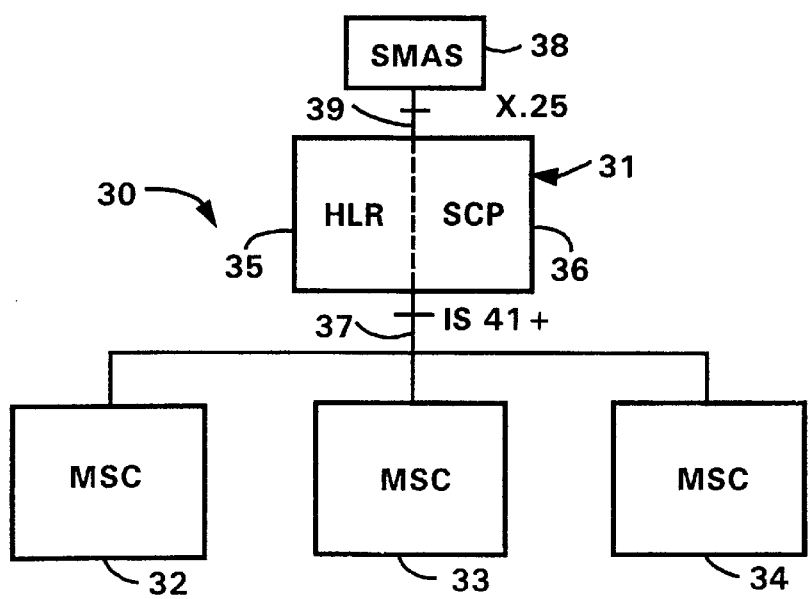
FIG. 3 is a simplified block diagram of one embodiment of a mobile intelligent network architecture in which the HLR/SCP of the present invention has been implemented.

FIG. 3 is a simplified block diagram of a mobile intelligent network architecture 30 in which the HLR/SCP 31 of the present invention has been implemented. In a cellular telecommunications network, a single HLR may serve as the database for either a single MSC or a group of MSCs. This is also true for the HLR/SCP of the present invention. In FIG. 3, there are three MSCs 32–34 associated with the HLR/SCP 31, however this number is exemplary only, and may be greater or lesser in other implementations.

Functionally, the HLR/SCP 31 is divided into a HLR component 35 and a SCP component 36. The interface between the HLR component 35 and the SCP component 36 is based on the IS-41 intersystem signaling protocol. The protocol is referred to as the Mobile-Intelligent Network (M-IN) signaling protocol. The M-IN protocol resides on a standard signaling system 7 TCAP platform to allow physical separation of the HLR component 35 and the SCP component 36, if required.

The interface provides for two-way communications between the HLR component 35 and the SCP component 36. Thus, the HLR component can access information stored in the SCP component, and the SCP component can access information stored in the HLR component. For example, the HLR component may contain information about the location of a mobile subscriber. The SCP component may access the HLR component and retrieve this information since the subscriber's IN profile may be location-dependent. Additionally, the two-way interface allows the SCP component to access other nodes in the cellular telecommunications network via the HLR component.

The HLR/SCP of the present invention functions for both originating and terminating calls with IN subscribers. For example, during call processing of a terminating call to an IN subscriber, the MSC handling the call (for example, MSC 32) queries the HLR component 35 in which the subscriber profile of the called mobile station is stored using IS-41+ signaling links 37. The proper HLR component is identified within the telecommunications network by the mobile identification number (MIN) of the calling or called mobile station. The MSC 32 queries the HLR component 35 for information about the mobile subscriber such as location, end-user services, and other supplementary information in order for the call to be processed.

If the call requires that an IN service be invoked, the HLR component 35 detects this fact and passes the request on to the SCP component 36. The SCP component responds accordingly, depending on the IN service invoked, and forwards the requested information to the HLR component. The HLR component 35, in turn, forwards the information to the requesting MSC 32.

The HLR/SCP functions may be managed by a network operator's existing service provisioning and management system. The IN services may be provisioned and managed by an equipment supplier's service management application system (SMAS) 38. In the preferred embodiment, the service management application system (SMAS) from Ericsson is utilized along with Ericsson's service management application (SMA). SMAS is an external platform that provides a graphical user interface for IN service script development. SMAS enables an operator to create different kinds of IN services and connect the necessary data to the services. The SMAS 38 also allows the operator to compile all the new or modified combinations of services and their related data and to send them to the HLR/SCP 31 for updating the SCP database. Service scripts are translated by SMAS into man-machine language (MAC) commands that are sent to the SCP component 36 via an X.25 link 39.

Existing HLRs in the PLMN support a number of subscriber categories or classes. Subscriber classes are assigned to subscribers with commands. The subscriber classes define certain characteristics of each subscriber and identify the services to which the subscriber subscribes. In the combined HLR/SCP 31 of the present invention, mobile IN subscribers are assigned IN categories or classes in the HLR component 35, depending on the type of service to which they subscribe. New classes are introduced to recognize IN subscribers as follows:

AIN Originating call access service. This is the only IN class which is sent to the MSC.

BIN Terminating call access service.

CIN Call transfer service.

Some of the subscriber classes are controlled (activated/deactivated) by the subscriber by means of procedure calls. Other classes are only controlled with commands.

At registration of a mobile station (MS), the serving MSC informs the HLR component 35 of the new location of the MS. The HLR component 35 stores the location information and queries the SCP component 36 as to the subscriber class for the mobile station. The HLR component then returns the classification of the subscriber to the MSC, including the subscriber's AIN class.

An IN call model in the HLR/SCP 31 utilizes IN triggers to invoke IN services. If required in some systems, IN triggers in the IN call model may be limited to originating calls, terminating call, and call transfer. However, with proper enhancements to the service switching function (SSF) in the MSC, and to the IS-41+ protocols between the MSC and the HLR/SCP, IN call triggers may be expanded.

Figure 4:
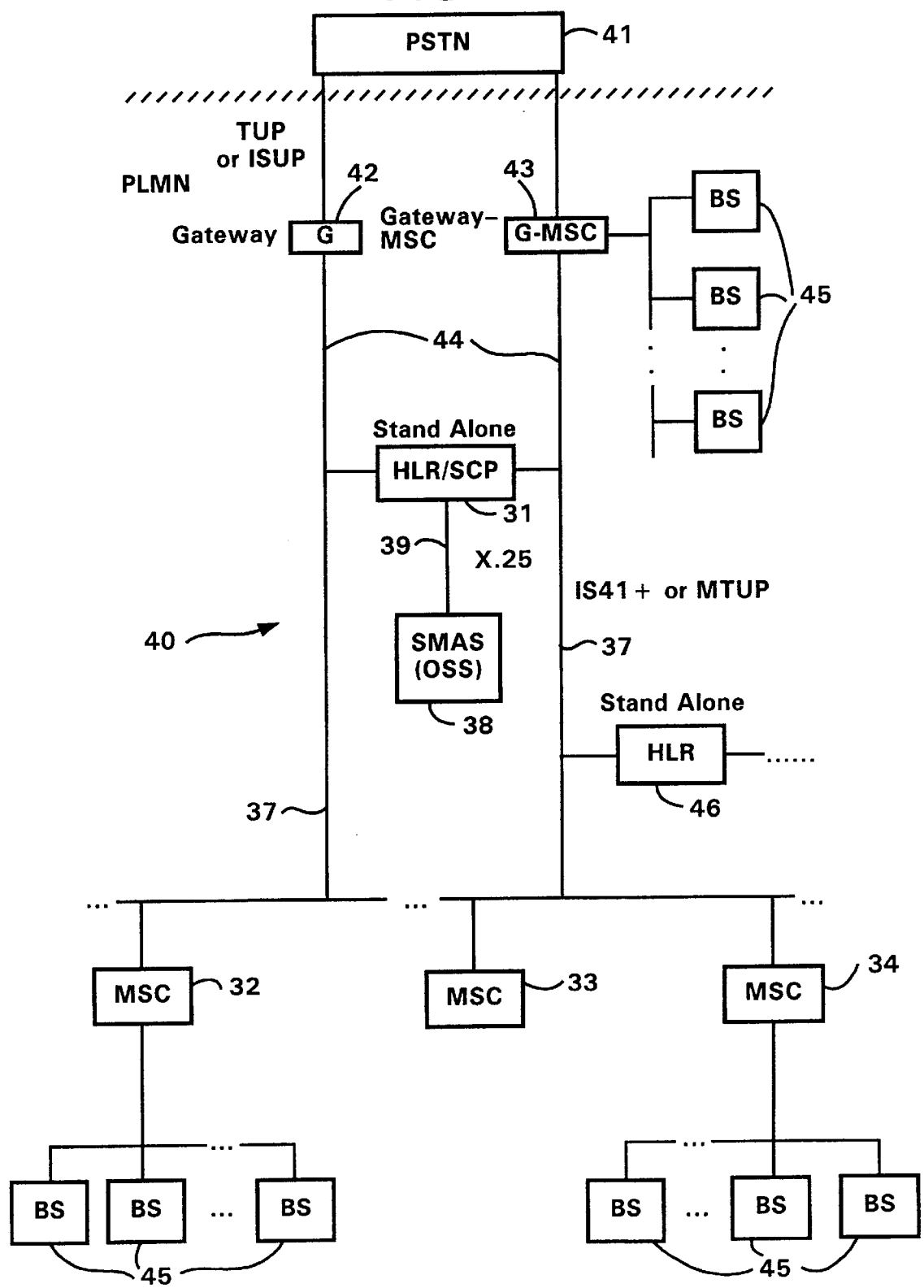
FIG. 4 is a more specific block diagram of one embodiment of the present invention in a public land mobile network (PLMN)

FIG. 4 is a more specific block diagram of one embodiment of the present invention in a public land mobile network (PLMN) 40. The PLMN 40 interfaces with the wireline public switched telephone network (PSTN) 41 via a gateway 42 or a combined gateway-mobile switching center (G-MSC) 43. The gateway 42 and the G-MSC 43 are connected to the HLR/SCP 31 via IS-41+ links 44. Other stand-alone MSCs 32–34 may also be connected to the HLR/SCP 31 via IS-41+ links 37. Each of the MSCs in the PLMN may be further connected to a plurality of base stations (BS) 45. One or more stand-alone HLRs 46 may also be included in the PLMN 40. The SMAS 38 interfaces with the HLR/SCP 31 via an X.25 link 39.

Figure 5:
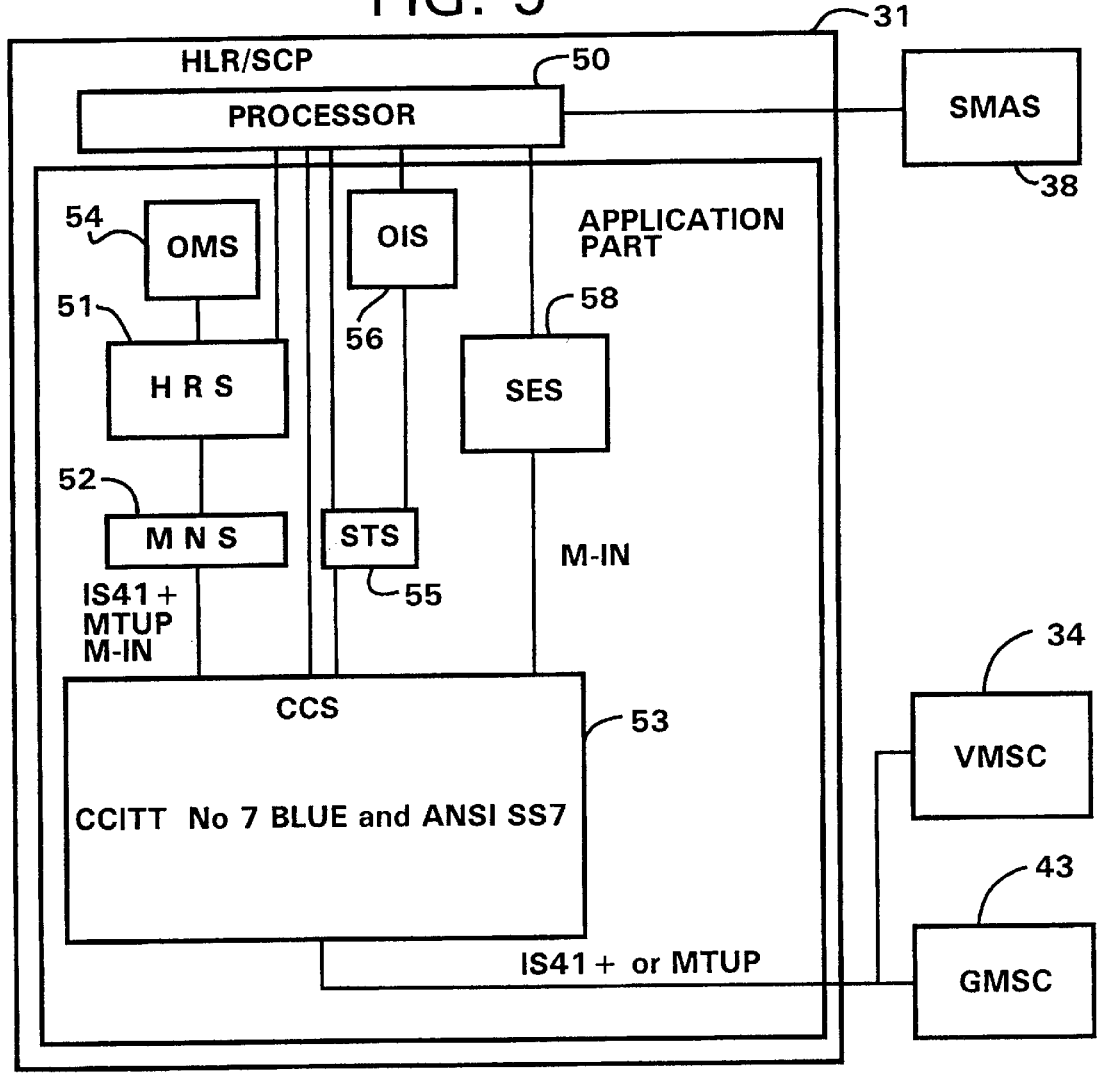
FIG. 5 is a functional block diagram of the combined HLR/SCP in the preferred embodiment of the present invention.

FIG. 5 is a functional block diagram of the combined HLR/SCP 31 in the preferred embodiment of the present invention. The HLR and SCP components are resident on a processor 50 that interfaces with the SMAS 38. The HLR component 35 comprises a Home Location Register Subsystem (HRS) 51, a Mobile Network Subsystem (MNS) 52, a Common Channel Signaling Subsystem (CCS) 53 which is shared with the SCP component 36, an Operation and Maintenance Subsystem (OMS) 54, a Statistics and Traffic Measurement Subsystem (STS) 55, and an Operations System Interface Subsystem (OIS) 56. The HRS 51 provides the functions in the HLR/SCP 31 that are specific to the Home Location Register HLR. These functions include:

Generation of commands to connect mobile subscribers and handle relevant subscriber and location data;

Generation of commands to administer cooperating exchange data;

Analysis of mobile station number and subscriber number to access subscriber data and location data;

Updating of location data for mobile subscribers;

Handling of subscriber procedure calls; and

Performing routing determinations.

The MNS 52 provides interfaces from the HRS 51 to the Common Channel Signaling (CCS) subsystem 53. The following protocols are supported:

IS-41+ which consists of a standard revision of IS-41 (rev.A, rev.B, etc.) and IN modifications. IS-41+ is used between HLRs, MSCs, and Gateway switches.

Ericsson's Mobile Telephone User Part (MTUP) which is nearly equivalent to IS-41+ but may be utilized for communication between Ericsson's HLRs, MSCs and Gateway switches.

Figure 6:
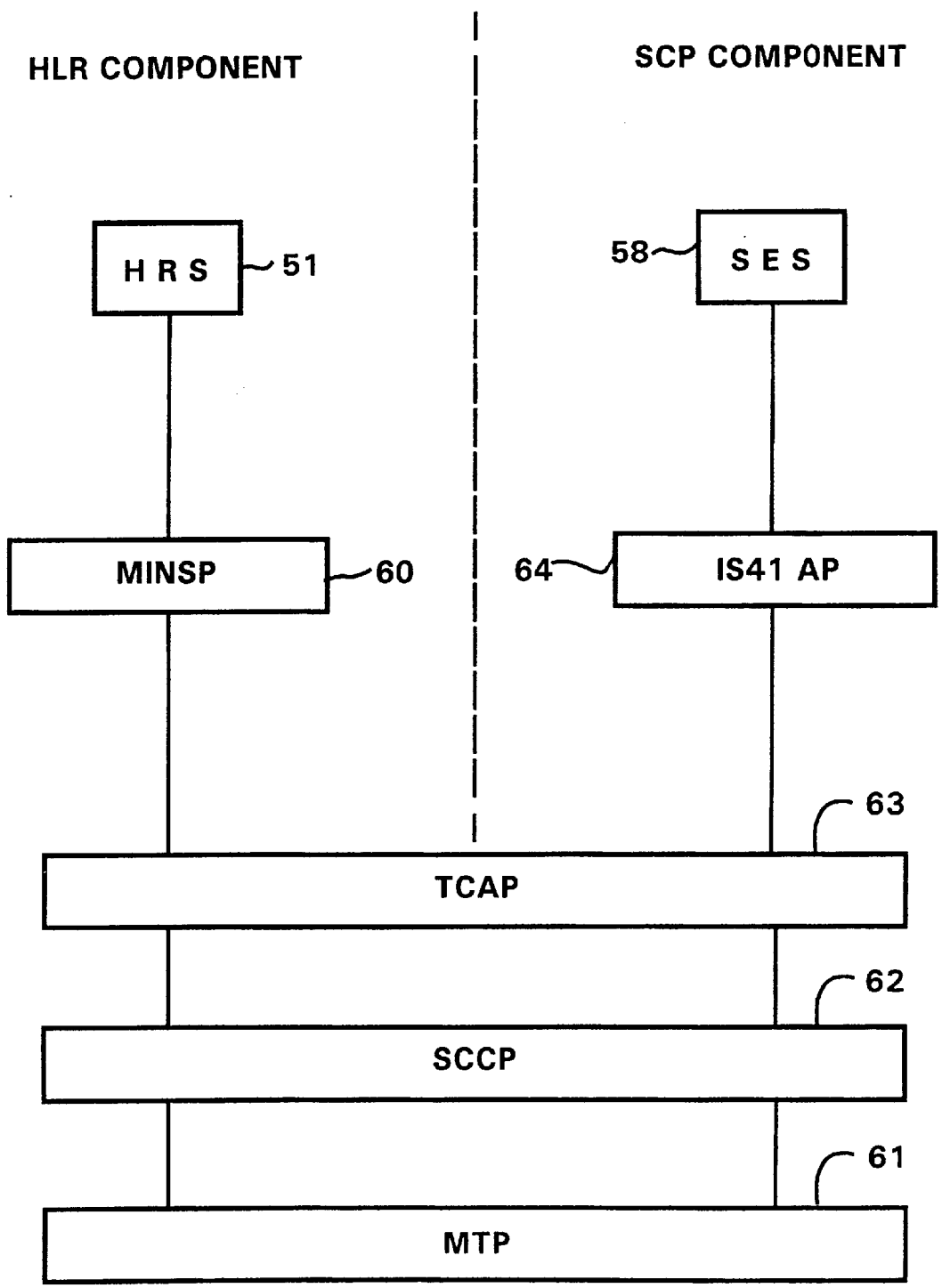
FIG. 6 is a block diagram illustrating the protocol layers in the M-IN protocol utilized between the HLR component and the SCP component.

Mobile-Intelligent Network (M-IN) protocol which is an IS-41 based communications protocol between the HLR component 35 and the SCP component 36, and is supervised by the software block Mobile Intelligent Network Signaling Protocol (MINSP) 60 and IS-41 AP protocol 64 (FIG. 6).

FIG. 6 is a block diagram illustrating the protocol layers in the M-IN protocol utilized between the HLR component 35 and the SCP component 36. The CCS subsystem 53 supports a Message Transfer Part (MTP) 61 which may be the CCITT-7 Blue (or higher) MTP or ANSI SS7 MTP. The CCS subsystem 53 also supports Signaling Connections Control Part (SCCP) 62, and TCAP signaling interfaces 63. The TCAP signaling interfaces 63 include general TCAP and TCAP load protection.

Referring again to FIG. 5, the OMS subsystem 54 is used for seizing of processor capacity.

The STS subsystem 55 is an optional subsystem used for printout of statistic reports by mean of counters defined in other subsystems.

The OIS subsystem 56 is an optional subsystem which uses STS data to print out event reports automatically.

The SCP component 36 provides Intelligent Network (IN) services which are sent from the Service Management Application System (SMAS) 38 via IOG11, to IN subscribers. The SCP component comprises a Service Script Interpreter (SSI) (not shown), a Service Provisioning Subsystem (SES) 58, and the CCS subsystem 53 which is shared with the BLR component 35.

The Service Script Interpreter (SSI) provides service logic in the network for the execution of IN services. The SSI contains Service Independent Building Blocks (SIBs) or "Control Types" as well as various combinations of SIBs known as Service Scripts which are defined via the SMAS system. Included with the Service Scripts is all the pertinent customer data.

The SES subsystem 58 provides the functions in the HLR/SCP 31 that are specific to the provision of services and data for IN subscribers received from the SMAS 38. The SES subsystem 58 also makes additional routing determinations for IN subscribers.

By means of TCAP support, the SCP component 36 communicates with the HLR component 35 via the CCS subsystem 53. The SCP component 36 receives Feature Request messages from the HLR component 35, accesses the requested IN service or data, and sends back the information to the HLR component in a Return Result message. The HLR component 35 recognizes predefined triggers or "access types" in the Feature Request message and then starts a dialog with the SCP component 36 to obtain information from the requested services (e.g., routing information for a call transfer). If the SCP component 36 does not have any IN services for the subscriber, it sends back to the HLR component 35 a Return Result message with no information, and the call is routed as if there is no SCP.

If non-IN services are loaded into the HLR component 35 for a particular mobile subscriber, and IN services have been loaded into the SCP component 36 for the same subscriber, the SCP component 36 overwrites the subscriber information in the HLR component 35. For example, a C-number in an IN service is utilized instead of a C-number in a non-IN service to which the subscriber subscribes. An exception exists, however, for variable non-IN services. In this case, the SCP component 36 is not consulted at all, and the HLR component 35 forwards its information in response to a service request.

A number of mobile IN services are provided by the HLR/SCP of the present invention. Such mobile IN services may include:

1-Closed User Group (CUG)

A Closed User Group (CUG) may consist of cellular subscribers who belong to the same organization and share the same set of services. For incoming and outgoing call screening services, individual number list screening takes precedence over the group number list. Several different services are offered to the CUG such as, for example, Selective Call Acceptance, Selective Call Rejection, Outgoing Call Restriction and Custom Dialing Plan (see 3, 4, 6 and 7 below). Some of the services in the set may be common to all members of the group while other services may be individualized for each subscriber.

2-Flexible Call Transfer

This service allows call forwarding to a transfer-to number (C-number) when the called party is inactive, busy, or does not answer the call. The C-number may be selected on the basis of the time of day, the day of the week, and the date.

3-Selective Call Acceptance

This service enables a cellular subscriber to receive incoming calls only from specified calling numbers (A-numbers) defined in a "white list". When there is a terminating call to a cellular subscriber who has his white list active, the directory number (DN) of the calling party is checked against the white list. If there is a match, the call is routed to the called party as normal. Otherwise, the call is rerouted to a pre-recorded announcement.

4-Selective Call Rejection

This service enables a cellular subscriber to prevent calls from certain A-numbers from being forwarded to a mobile station, based on a subscriber-specific restriction list of calling numbers. The restricted A-numbers are defined in a "black list". When there is a terminating call to a cellular subscriber who has his black list active, the DN of the calling party is checked against the black list. If there is a match, the call is rerouted to a pre-recorded announcement. Otherwise, the call is routed to the called party as normal.

5-800-Type Number Translation

This service allows a call to an 800-number DN to be routed to different DNs depending on the time of day, the day of the week, and the date.

6-Outgoing Call Registration

This service restricts originating calls from a mobile station to specified called numbers (B-numbers). The restricted B-numbers are defined in a "black list" as complete B-numbers or a series of B-numbers such as a group of B-numbers with a common first digit. Calls originating from a cellular subscriber are compared against the B-number black list. If there is a match, the call is optionally routed to an announcement and terminated. Otherwise, the call is routed to the called party as normal.

7-Custom Dialing Plan

This service allows a custom (abbreviated) dialing plan for cellular subscribers. Frequently called B-numbers are reached by dialing corresponding abbreviated numbers. For each B-number, there is one corresponding abbreviated number. The called party corresponding to an abbreviated number may be either a cellular or a PSTN subscriber.

Figure 7:
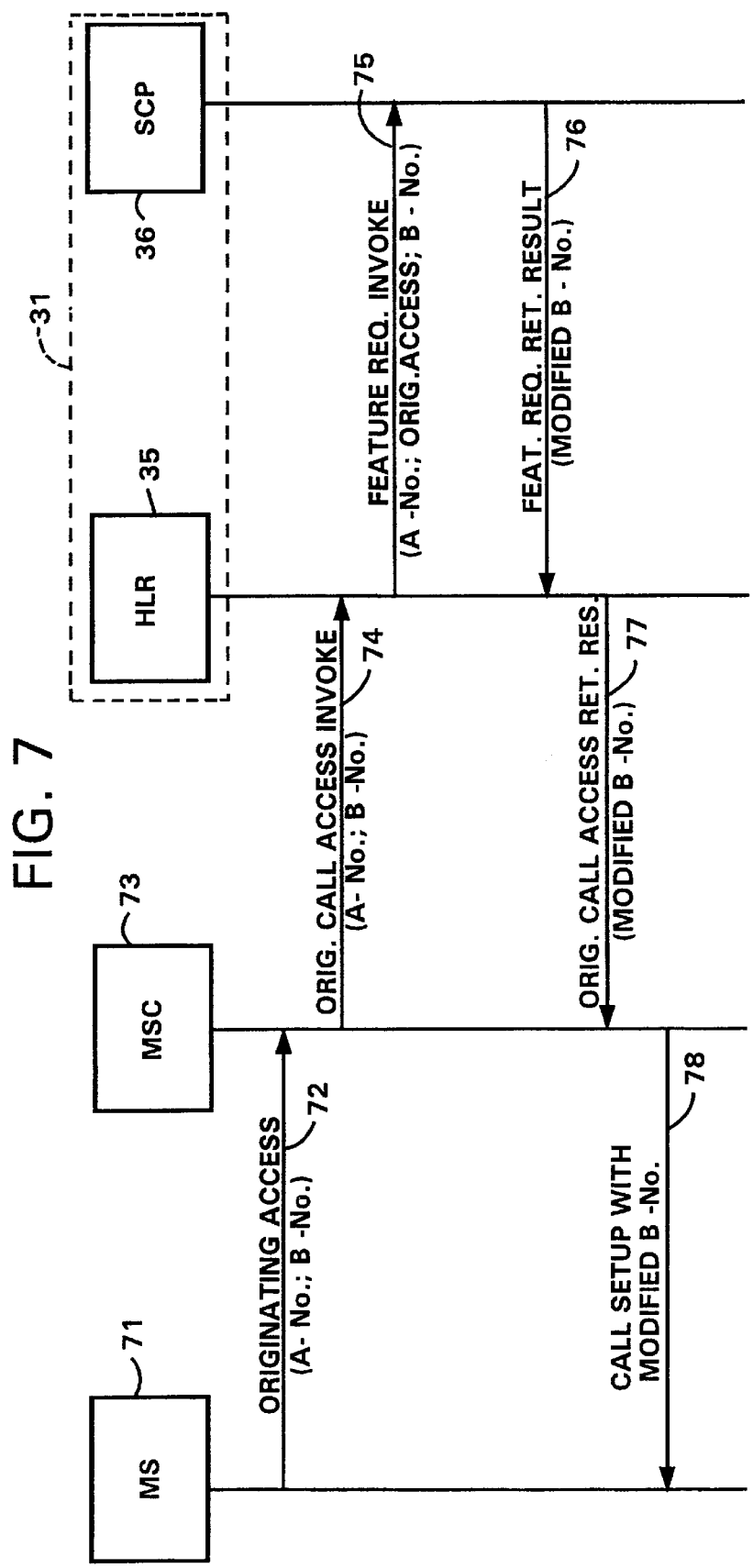
FIG. 7 is a message flow diagram illustrating the signaling messages involved in an originating call access from a mobile intelligent network (IN) subscriber according to the teachings of the present invention.

FIG. 7 is a message flow diagram illustrating the signaling messages involved in an originating call access from a mobile intelligent network (IN) subscriber according to the teachings of the present invention. The message flow begins at a mobile station (MS) 71 assigned to an IN subscriber. An Originating Call Access message 72 includes an A-number (DN of the mobile station 71) and a B-number (DN of a called party) and is sent to a MSC 73. The MSC determines whether or not an A-IN class is set for the A-number received. If an A-IN class is not set, the MSC routes or rejects the call as usual. If an A-IN class is set for the A-number received, the MSC 73 requests the HLR component 35 to find any IN services stored in the SCP component 36 that are associated with the A-number. The MSC 73 sends an Originating Call Access Invoke message 74, including the A-number and the B-number, to the HLR component 35 of the HLR/SCP 31. The HLR component 35 sends a Feature Request Invoke message 75 to the SCP component 36 to determine if there are any IN services stored there. The Feature Request Invoke message 75 includes the A-number, the Originating Access, and the B-number.

The SCP component 36 searches for IN services associated with the A-number. If IN services are found and subscribed to, the SCP component 36 sends a Feature Request Return Result message 76 to the HLR component 35 and includes a modified B-number. The modified B-number could be routing information to an announcement machine if, for example, there is an outgoing call restriction. The modified B-number could also be a number for a real subscriber, and may be an entire B-number or an abbreviated B-number for a Closed User Group with a custom dialing plan, depending on the services and their data.

The HLR component 35 then sends an Originating Call Access Return Result message 77 to the MSC 73 and includes the modified B-number. The MSC 73 then proceeds with call setup at 78 utilizing the modified B-number.

Figure 8:
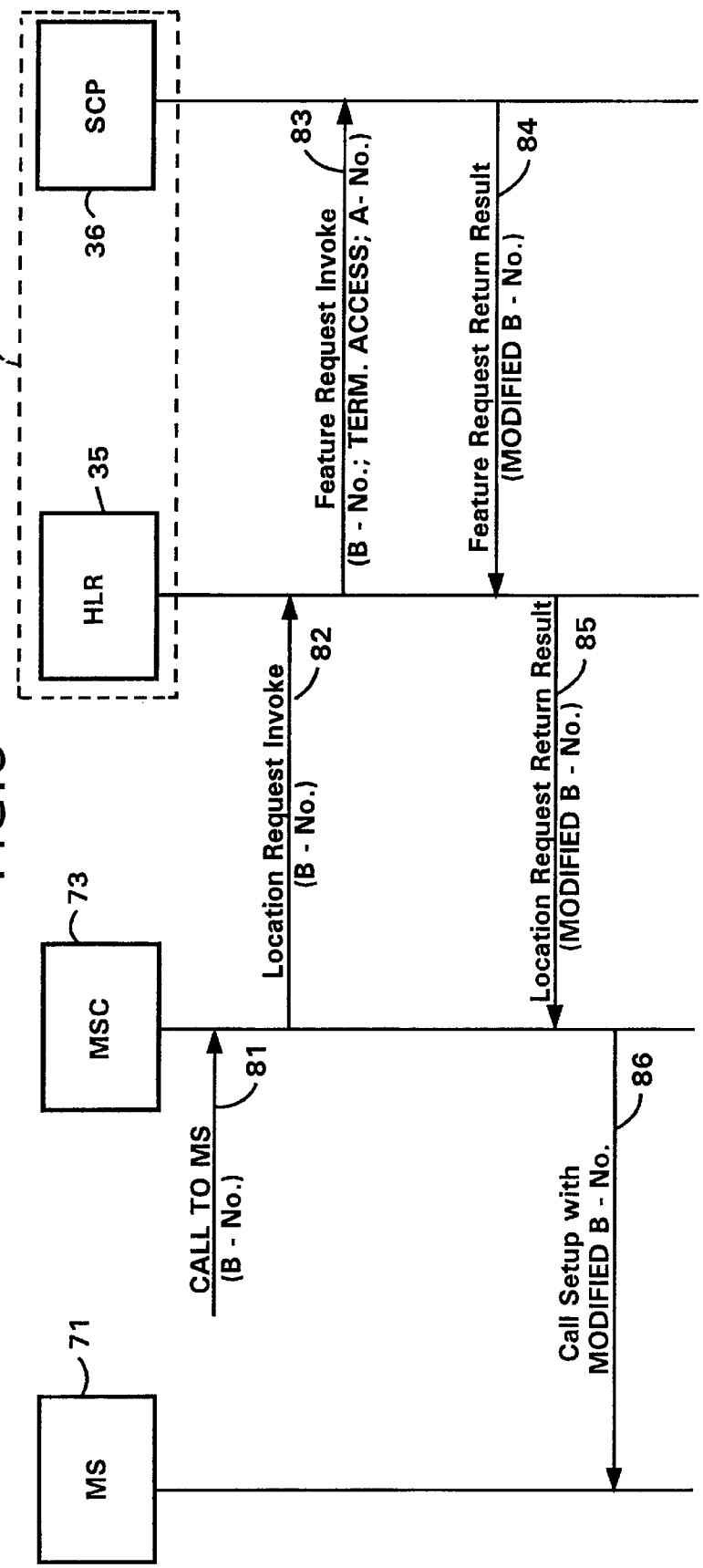
FIG. 8 is a message flow diagram illustrating the signaling messages involved in a terminating call to a mobile IN subscriber according to the teachings of the present invention.

FIG. 8 is a message flow diagram illustrating the signaling messages involved in a terminating call to a mobile intelligent network (IN) subscriber according to the teachings of the present invention. The message flow begins at 81 where a call from a visited MSC to the mobile station (MS) 71 is received at the MSC 73. The MSC sends a Location Request Invoke message 82 to the HLR component 35 and includes the B-number, in this case the DN of the mobile station 71. The HLR component 35 determines whether a B-IN class is set for the B-number received. If not, the HLR component sends a Routing Request Return Result message to the visited MSC as usual. If a B-IN class is set for the B-number received, the HLR component 35 sends a Feature Request Invoke message 83 to the SCP component 36 to find any IN services associated with the B-number. The Feature Request Invoke message 83 includes the B-number, the Terminating Access, and the A-number of the calling party.

The SCP component 36 searches for IN services associated with the B-number. If IN services are found, the SCP component 36 sends a Feature Request Return Result message 84 to the HLR component 35 and includes a modified B-number or other routing information such as, for example, routing to an announcement machine if there is an incoming call restriction. The modified B-number could also be a number for a real subscriber, and may be an entire B-number or an abbreviated B-number for a Closed User Group with a custom dialing plan, depending on the services and their data.

The HLR component 35 then sends a Location Request Return Result message 85 to the MSC 73 and includes the modified B-number. The MSC 73 then proceeds with call setup at 86 utilizing the modified B-number.

Figure 9:
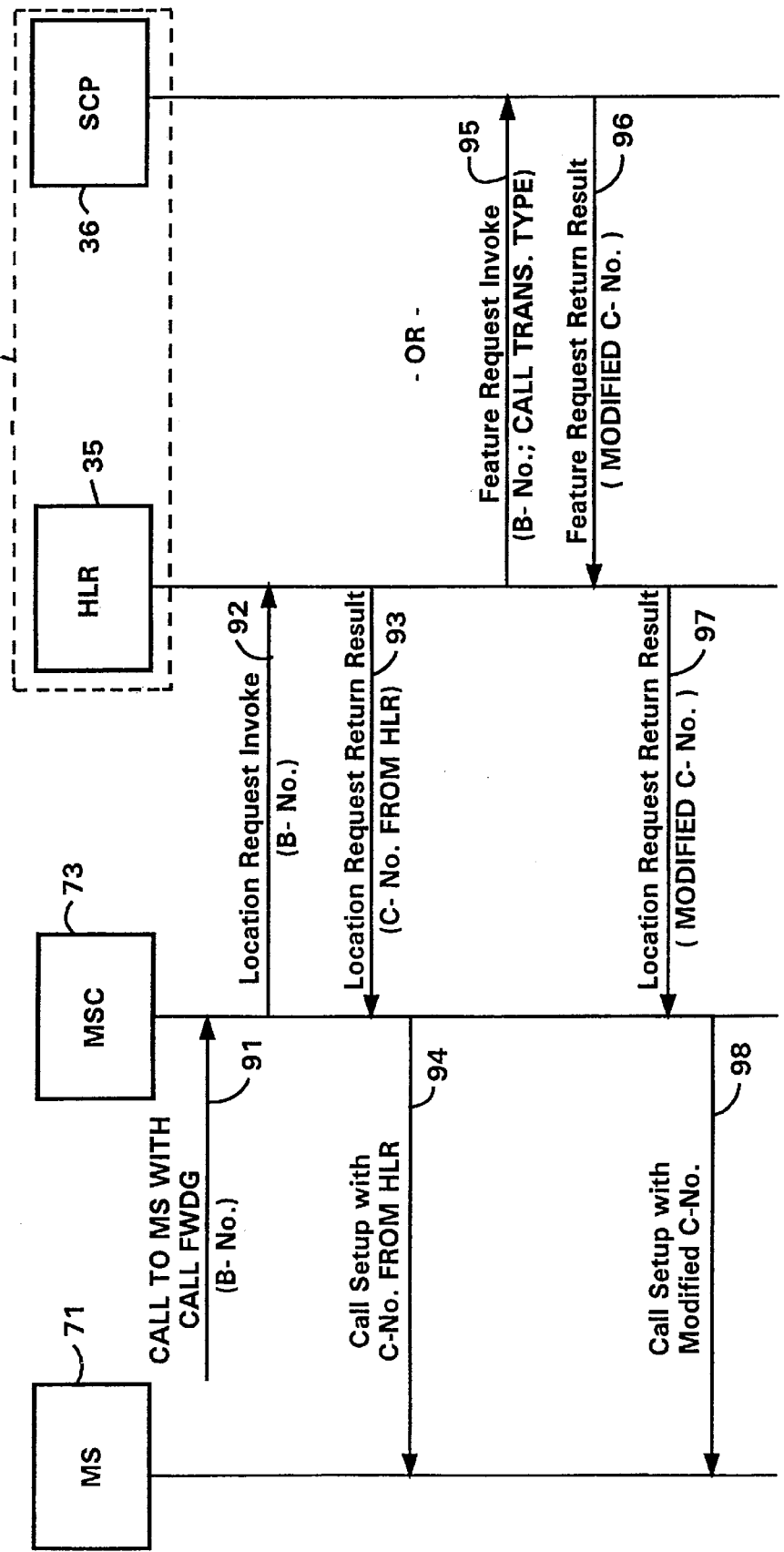
FIG. 9 is a message flow diagram illustrating the signaling messages involved in a call transfer traffic event for a mobile IN subscriber according to the teachings of the present invention.

FIG. 9 is a message flow diagram illustrating the signaling messages involved in a call transfer traffic event for a mobile intelligent network (IN) subscriber according to the teachings of the present invention. The message flow begins at 91 where a call from a visited MSC to the mobile station (MS) 71 is received at the MSC 73. The mobile station 71 has normal (i.e., non-IN) call forwarding. The MSC sends a Location Request Invoke message 92 to the HLR component 35 and includes the B-number, in this case the DN of the mobile station 71. The HLR component 35 determines whether a C-IN class is set for the B-number received. If not, the HLR component sends a non-IN Location Request Return Result message 93 to the visited MSC 73 with the call forwarding (C-number) from the HLR database. Thereafter, call setup is completed utilizing the C-number from the HLR database. However, if a C-IN class is set for the B-number received, the HLR component 35 sends a Feature Request Invoke message 95 to the SCP component 36 to find any IN services associated with the B-number. The Feature Request Invoke message 95 includes the B-number and the Call Transfer Type.

The SCP component 36 searches for call transfer IN services associated with the B-number. If call transfer IN services are found, the SCP component 36 sends a Feature Request Return Result message 96 to the HLR component 35 and includes a modified C-number. The HLR component 35 then sends an IN Location Request Return Result message 97 to the MSC 73 and includes the modified C-number. The MSC 73 then proceeds with call setup at 98 utilizing the modified C-number.

Figure 10:
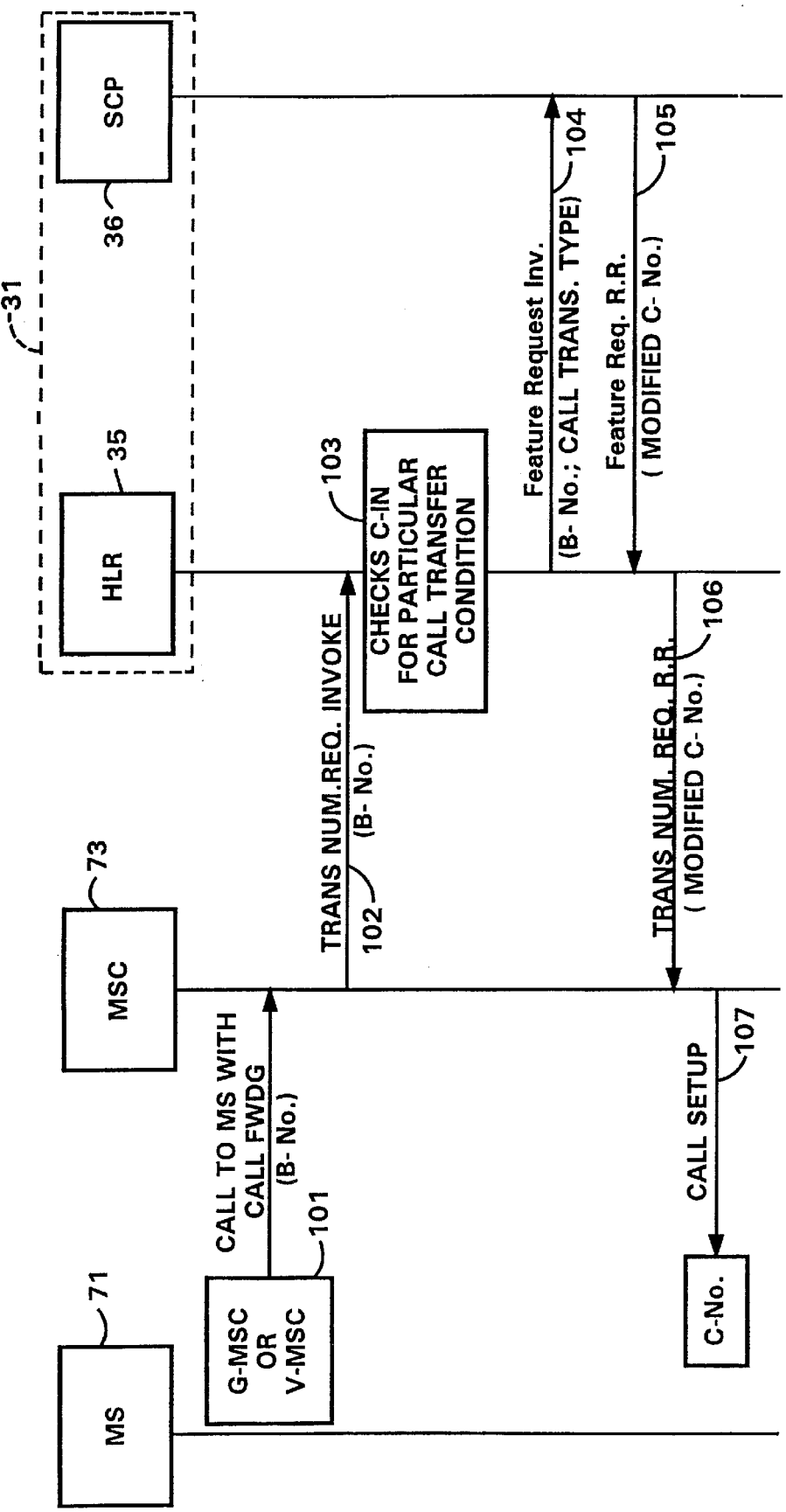
FIG. 10 is a message flow diagram illustrating the signaling messages involved in a call transfer traffic event for a mobile intelligent network (IN) subscriber when the mobile station is busy, according to the teachings of the present invention.

FIG. 10 is a message flow diagram illustrating the signaling messages involved in a call transfer traffic event for a mobile intelligent network (IN) subscriber when the mobile station is busy, according to the teachings of the present invention. A call transfer event may be invoked by either the G-MSC or a visited MSC (V-MSC) 101, or may be triggered by the G-MSC upon receipt of a Redirection Request message. At that time, a Transfer-to Number Request Invoke message 102 is sent from the MSC 73 to the HLR component 35. The HLR component determines whether a C-IN class is set for a particular call transfer condition (e.g., busy, no answer, etc.) at 103. If the subscriber has a C-IN set, the HLR component sends a Feature Request Invoke message 104 to the SCP component 36 and includes the B-number and the Call Transfer Type.

The SCP component 36 searches for call transfer IN services associated with the B-number. If call transfer IN services are found, the SCP component 36 sends a Feature Request Return Result message 105 to the HLR component 35 and includes a modified C-number. The HLR component 35 then sends a Transfer-to-Number Return Result message 106 to the MSC 73 and includes the modified C-number. The MSC 73 then proceeds with call setup at 107 utilizing the modified C-number.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for interfacing cellular telecommunication database functions with intelligent network (IN) functions without accessing the public switched telephone network, and without modifying mobile switching centers (MSCs) in order to implement IN services, said system comprising:

a home location register (HLR) component for storing mobile subscriber information and location information on mobile stations;

a service control point (SCP) component for storing IN services for mobile subscribers, said SCP component being directly connected to the HLR component; and a cellular telecommunication interface based on IS-41 between said HLR component and said SCP component, said interface sending requests for IN services from the HLR component to the SCP component, and sending results of the requested IN services from the SCP component to the HLR component.

2. The system for combining cellular telecommunication database functions with intelligent network (IN) functions of claim 1 wherein said HLR component and said SCP component are co-located in a single physical unit.

3. The system for combining cellular telecommunication database functions with intelligent network (IN) functions of claim 1 wherein said HLR component includes means for determining whether a call requires an IN service to be invoked.

4. The system for combining cellular telecommunication database functions with intelligent network (IN) functions of claim 3 wherein said HLR component includes:

means for determining whether a requested IN service is authorized for a mobile subscriber associated with said call; and means for requesting the SCP component to invoke an IN service upon determining that said requested IN service is authorized for said mobile subscriber.

5. The system for combining cellular telecommunication database functions with intelligent network (IN) functions of claim 4 wherein said SCP component includes means for invoking said requested IN service.

6. An intelligent mobile radio telecommunications network comprising:

a combined home location register and service control point (HLR/SCP) for storing mobile subscriber information, intelligent network (IN) services, and mobile station location information, said HLR/SCP including:

a home location register (HLR) component for storing mobile subscriber information and location information on mobile stations;

a service control point (SCP) component for storing IN services for mobile subscribers, said SCP component being directly connected to the HLR component; and a cellular telecommunication interface based on IS-41 between said HLR component and said SCP component, said interface sending requests for IN services from the HLR component to the SCP component, and sending results of the requested IN services from the SCP component to the HLR component;

a mobile switching center (MSC) connected to said ELR/SCP via communication links based on IS-41; and an operation support system for defining said IN services and connecting necessary data to said IN services.

7. The intelligent mobile radio telecommunications network of claim 6 wherein said HLR component and said SCP component are co-located in a single physical unit.

8. The intelligent mobile radio telecommunications network of claim 7 wherein said HLR component includes means for determining whether a call requires an IN service to be invoked.

9. The intelligent mobile radio telecommunications network of claim 8 wherein said HLR component includes:

means for determining whether a requested IN service is authorized for a mobile subscriber associated with said call; and means for requesting the SCP component to invoke an IN service upon determining that said requested IN service is authorized for said mobile subscriber.

10. A combined home location register and service control point (HLR/SCP) for storing mobile subscriber data, intelligent network (IN) services, and mobile station location data, said HLR/SCP comprising: an application part comprising:
- a home location register (HLR) component which includes:
  - means for storing mobile subscriber data and mobile station location data;
  - means for updating mobile subscriber data and mobile station location data;
  - means for analyzing mobile station numbers and subscriber numbers to access said mobile subscriber data and mobile station location data;
  - means for performing routing determinations; and
  - means for generating commands to connect mobile subscribers and handle relevant mobile subscriber data and mobile station location data;
  - means for generating requests for IN services, and
- a service control point (SCP) component directly connected to the HLR component via an interface based on IS-41, said SCP component including:
  - a service script interpreter (SSI) which provides service logic for executing said IN services; and
  - means for sending results of the IN services directly to the HLR component: and
- a processor for interfacing said application part with an operation support system.

11. The HLR/SCP of claim 10 wherein said SSI includes service scripts for defining said IN services.

12. A method of interfacing cellular telecommunication database functions with intelligent network (IN) functions without accessing the public switched telephone network, and without modifying mobile switching centers (MSCs) in order to implement IN services, said method comprising the steps of:
- storing in a home location register (HLR) component, mobile subscriber information and location information on mobile stations;
- directly connecting the HLR component to a service control point (SCP) component;
- storing in the SCP component, IN services for mobile subscribers; and
- providing a cellular telecommunication interface based on IS-41 between said HLR component and said SCP component, said interface sending requests for IN services from the HLR component to the SCP component, and sending results of the requested IN services from the SCP component to the HLR component.

13. The method of combining cellular telecommunication database functions with intelligent network (IN) functions of claim 12 further comprising the steps of:
- determining whether a call requires an IN service to be invoked;
- determining whether a requested IN service is authorized for a mobile subscriber associated with said call; and
- requesting the SCP component to invoke an IN service upon determining that said requested IN service is authorized for said mobile subscriber; and
- invoking said requested IN service.

14. A method of performing call origination from a mobile station in a mobile intelligent network (IN) having a combined home location register and service control point (HLR/SCP), said HLR/SCP having a HLR component and a SCP component connected directly to the HLR component via an interface based on IS-41, said method comprising the steps of:
- sending an originating call access message from said mobile station to a mobile switching center (MSC), said originating call access message including the directory number of said mobile station and a called directory number;
- determining whether an IN class has been set for said directory number of said mobile station;
- requesting said HLR component to find any IN services stored in said SCP component that are associated with said directory number of said mobile station;
- sending a request directly from the HLR component to the SCP component requesting IN services that are associated with the directory number of the mobile station;
- searching in said SCP component for the requested IN services; and
- returning modified call routing instructions from the SCP component directly to said HLR component and then to said MSC based upon said IN services that are associated with said directory number of said mobile station.

15. The method of performing call origination from a mobile station in a mobile intelligent network (IN) of claim 14 wherein said step of requesting said HLR component to find any IN services stored in said SCP component includes sending an originating call access invoke message from said MSC to said HLR component, said originating call access invoke message including the directory number of said mobile station and said called directory number.

16. The method of performing call origination from a mobile station in a mobile intelligent network (IN) of claim 15 wherein said step of sending a request directly from the HLR component to the SCP component requesting IN services includes sending a feature request invoke message from said HLR component to said SCP component.

17. A method of performing call termination to a mobile station in a mobile intelligent network (IN) having a combined home location register and service control point (HLR/SCP), said HLR/SCP having a HLR component and a SCP component connected directly to the HLR component via an interface based on IS-41, said method comprising the steps of:
- receiving at a mobile switching center (MSC), a call directed to said mobile station;
- sending a location request invoke message from said MSC to said HLR component, said location request invoke message including the directory number of said mobile station;
- determining whether an IN class has been set for said directory number of said mobile station;
- requesting said HLR component to find any IN services stored in said SCP component that are associated with said directory number of said mobile station;
- sending a request directly from the HLR component to the SCP component requesting IN services that are associated with the directory number of the mobile station;
- searching in said SCP component for the requested IN services; and
- returning modified call routing instructions from the SCP component directly to said HLR component and then to said MSC based up on said IN services that are associated with said directory number of said mobile station.

18. A method of performing a call transfer event for a call directed to a mobile station in a mobile intelligent network (IN) having a combined home location register and service control point (HLR/SCP), said HLR/SCP having a HLR component and a SCP component connected directly to the HLR component via an interface based on IS-41, and said mobile station having non-IN call forwarding, said method comprising the steps of:

receiving at a mobile switching center (MSC), a call from a visited MSC directed to said mobile station;

sending a location request invoke message from said MSC to said HLR component, said location request invoke message including the directory number of said mobile station;

determining whether an IN class has been set for said directory number of said mobile station;

sending, upon determining that an IN class has not been set for said directory number of said mobile station, a non-IN location request return result message from said HLR component to said visited MSC, said non-IN location request return result message including a call forwarding number from said HLR component;

requesting, upon determining that an IN class has been set for said directory number of said mobile station, said HLR component to find any IN services stored in said SCP component that are associated with said directory number of said mobile station;

sending a request directly from the HLR component to the SCP component requesting IN services that are associated with the directory number of the mobile station;

searching in said SCP component for the requested IN services;

returning a modified call forwarding number from the SCP component directly to said HLR component; and sending an IN location request return result message from said HLR component to said visited MSC, said IN location request return result message including the modified call forwarding number.

19. The system for combining cellular telecommunication database functions with intelligent network (IN) functions of claim 1 wherein said HLR component and said SCP component are remotely located from each other in a cellular telecommunications network.

20. The intelligent mobile radio telecommunications network of claim 6 wherein said HLR component and said SCP component are remotely located from each other in the mobile radio telecommunications network.

* * * * *